(12) United States Patent
Genc et al.

(10) Patent No.: US 7,374,103 B2
(45) Date of Patent: May 20, 2008

(54) OBJECT LOCALIZATION

(75) Inventors: Yakup Genc, Princeton, NJ (US);
Xiang Zhang, Lawrenceville, NJ (US)

(73) Assignee: Siemens Corporate Research, Inc.,
Princeton, NJ (US)

( * ) Notice: Subject to any disclaimer, the term of this patent is extended or adjusted under 35 U.S.C. 154(b) by 374 days.

(21) Appl. No.: 11/195,311

(22) Filed: Aug. 2, 2005

(65) Prior Publication Data

US 2006/0027658 A1    Feb. 9, 2006

Related U.S. Application Data

(60) Provisional application No. 60/598,564, filed on Aug. 3, 2004.

(51) Int. Cl.
*G06K 19/06* (2006.01)

(52) U.S. Cl. .................. 235/492; 340/10.1; 340/10.52

(58) Field of Classification Search ................ 235/375, 235/492; 340/10.1, 10.52, 572.1
See application file for complete search history.

(56) References Cited

U.S. PATENT DOCUMENTS 5,792,147 A * 8/1998 Evans et al. ................ 606/130
2005/0052281 A1* 3/2005 Bann ..................... 340/539.13

FOREIGN PATENT DOCUMENTS

GB    2 246 261 A  *  1/1992
GB    2 355 876 A  *  5/2001

* cited by examiner

*Primary Examiner*—Daniel A Hess

(57) ABSTRACT

A computer-implemented method for object localization includes providing a plurality of tags having fixed positions within an environment and known identifications, and providing a reader, for detecting the tags and reading the identifications, wherein the reader detects a plurality of tags within a scanning volume having a known shape. The method further includes determining positions for the plurality of tags within the scanning volume, and determining a position of the reader according to the positions for the plurality of tags within the scanning volume and the known shape of the scanning volume.

20 Claims, 4 Drawing Sheets

OBJECT LOCALIZATION

OBJECT LOCALIZATION

This application claims priority to U.S. Provisional Application Ser. No. 60/598,564, filed on Aug. 3, 2004, which is herein incorporated by reference in its entirety.

BACKGROUND OF THE INVENTION

1. Technical Field

The present invention relates to object localization, and more particularly to a system and method for RFID based localization of an object.

2. Discussion of Related Art

Localization as a technology finds use in many applications ranging from autonomous navigation to augmented reality. There are many different technologies that can be used in localization, for example, the global positioning system (GPS) and cameras.

Few proposed solutions for limited application domains have been demonstrated. A generic technology is yet to be developed for multiple purposes.

Therefore, a need exists for an improved system and method for object localization.

SUMMARY OF THE INVENTION

According to an embodiment of the present disclosure, a computer-implemented method for object localization comprises providing a plurality of tags having fixed positions within an environment and known identifications, and providing a reader, for detecting the tags and reading the identifications, wherein the reader detects a plurality of tags within a scanning volume having a known shape. The method further comprises determining positions for the plurality of tags within the scanning volume, and determining a position of the reader according to the positions for the plurality of tags within the scanning volume and the known shape of the scanning volume.

The scanning volume comprises one or more ellipsoid-shaped volumes.

The reader determines the positions for the plurality of tags within the scanning volume from a lookup table according to the identification of each tag within the scanning volume.

The method comprises refining the position of the reader using a vision-based tracking system having a camera with a known position and pose with respect to the reader.

The method comprises tracking a first object coupled to the reader according to the position of the reader. The method comprises refining the position of the first object using a vision-based tracking system having a camera with a known position and pose with respect to the reader.

The method comprises tracking a second object using a vision-based tracking system having a camera with a known position and pose with respect to the reader.

The method comprises comprising determining the position of the reader over time.

The method comprises the identification and position of an active tag of the plurality of tags to an onboard memory of the active tag.

According to an embodiment of the present disclosure, a system for tracking comprises a coordinate system of tags within an environment, each tag having a known identification and a known fixed position, and a reader for detecting the identifications and determining the known fixed positions, wherein the reader detects tags within a scanning volume having a known shape, the reader determining its position according to the known fixed positions and the known shape of the scanning volume.

The method comprises a vision-based tracker including a camera coupled to the reader at a known position and pose thereof.

A first tag comprises a memory for storing the known identification and the known fixed position.

The scanning volume comprises multiple ellipsoidal scanning volumes with known correspondences there between.

According to an embodiment of the present disclosure, a program storage device is provided readable by machine, tangibly embodying a program of instructions executable by the machine to perform method steps for object localization. The method comprises providing a plurality of tags having fixed positions within an environment and known identifications, and providing a reader, for detecting the tags and reading the identifications, wherein the reader detects a plurality of tags within a scanning volume having a known shape. The method further comprises determining positions for the plurality of tags within the scanning volume, and determining a position of the reader according to the positions for the plurality of tags within the scanning volume and the known shape of the scanning volume.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
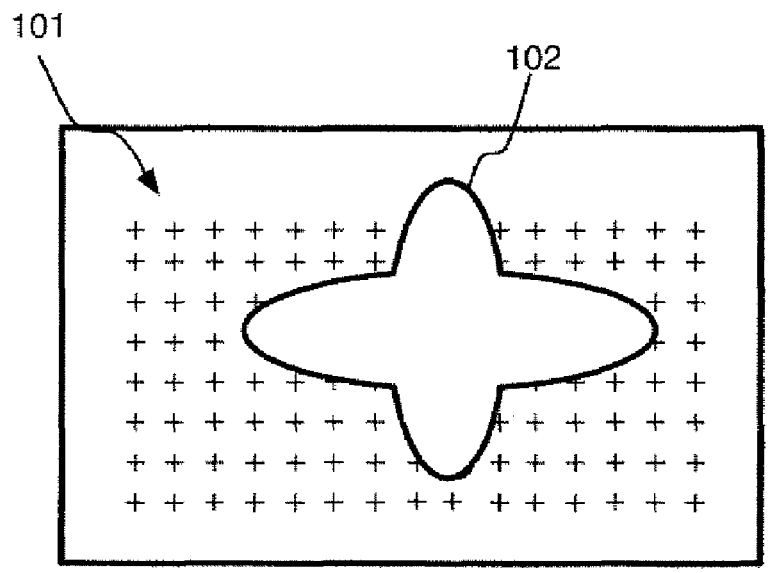
FIG. 1 is an illustration of an array of RFID tags according to an embodiment of the present disclosure.

According to an embodiment of the present disclosure, a hybrid system for object localization includes a radio-frequency identification (RFID) tracking system and a vision-based tracking system. A set of detectable RFID tags is placed in an environment. An approximate position and orientation of a tag reader in the environment is determined relative to two or more tags. A camera is rigidly attached to a tag reader at a known pose. Using the positional information determined using the RFID system and the known pose of the camera relative to the tag reader, a second object can be tracked using the camera in a vision-based tracking system. The vision-based tracking system is marker-less, using the RFID system for an approximate registration of the camera and its view. The RFID tracking system improves the vision-based tracking system to meet a desired accuracy and robustness of the hybrid system.

RFID tags provide identification (ID) information within the environment. The RFID tags may be for example, low frequency tags (125 or 134.2 kHz), high frequency tags (13.56 MHz), UHF (ultra high frequency) tags (868 to 956

MHz), and/or microwave tags (2.45 GHz). The position of each tag is known to the tag reader. Further, the shape of a scanning volume for the tag reader is known. The tag reader uses a lookup table including a set IDs and positions of the tags, and a sub-set of IDs within the tag reader's known scanning volume to determine its position.

The positions of the uniquely identifiable RFID tags are recorded with respect to a coordinate system. These positions are made known to the tag reader. The tag reader reads the IDs of the tags within its scanning volume. The location of the tag reader with respect to the reference coordinate system is determined using the lookup table or similar database. The precision of the determination may depend on the spatial granularity of the RFID tags (for example, placed every inch, 6 inches, 2 yards, etc.). Given two or more RFID scanning volumes (given by the same RFID reader to two or more RFID readers having known correspondences there between) having a known geometric relationship there between, the orientation of the tag reader(s) can be determined. Temporal tracking of the tag reader can improve the quality of the localization results.

The shape of the surface on which the RFID tags are placed can affect accuracy and precision. The RFID tags can lie on different surfaces, e.g., two perpendicular walls. Different surfaces when considered along with the scanning volume can yield different position and orientation information.

Flat/planar surfaces can include ceilings, walls, and floors. For example, a regular grid of tags can be placed on the ceiling to have a planar surface for the tag placements.

Multiple flat surfaces at different depths can be used. For example, a set of planes at different depths can be created. Depending on the shape of the scan volume, this arrangement can provide improved orientation information over a single surface embodiment.

The RFID tags can be placed in many different ways. For example, RFID tags can be integrated in screws or stickers. The RFID tags can be bolted or adhered in the environment. According to another example, RFID tags can be embedded in carpet or hardwood floors.

Once the RFID tags are placed, their locations are recorded. This can be done by hand if the tag location is known. An alternative is to use an external localization system along with a tag reader. The system includes a tool that, given an external localization system, provides absolute measurements for the tag reader location, the tag reader reads the ID of the RFID tag it is pointing at and records the RFID tag's estimated location based on the input from the external localization system. If the RFID tag has a re-writable memory, this location information can be included in the RFID tag's memory along with its ID number.

Given the known placement of the RFID tags in an environment, and the shape of the scan volume of the tag reader, certain information about the location of the tag reader in the environment can be determined. This determination is geometrical and can be extended with time information.

Referring to FIG. 1, in one example scenario, assume that in an indoor environment, a regular grid 101 of passive RFID tags has been placed on the ceiling. Further, assume that the locations of these tags are known to a desired precision. Each RFID tag has a unique ID. Given the known shape of the scanning volume 102, the location of the scanner/reader can be determined with respect to a coordinate system of which the positions of the passive RFID tags are known. The scanning volume 102 and its intersection with the grid 101 on which the RFID tags lie, as shown in FIG. 1, can yield orientation information to a certain accuracy.

The shape of the scanning volume can be used in localization. Similar to the surface shape of the RFID tags, the shape of the scan volume limits the amount of the localization information that can be recovered. For example, a single ellipsoidal type of volume can provide constraint on a single degree of freedom (DOF) out of six DOF pose.

Different types of information can be obtained using the RFID tags and the scan volume. In a system and/or method implementing RFID tags on a single plane and ellipsoidal shaped scan volume, the intersection of the ellipsoid and the plane provides a single constraint on the location and orientation of the sensor. Integrated over time, this information can provide a bootstrap for the vision system to recover the pose completely.

In a system and/or method implementing RFID tags on a single plane and a multiple ellipsoid-shaped volume, as shown in FIG. 1, three constraints on the motion are available. These constraints are on the two DOFs for the horizontal location of the scan volume and one on the single DOF for the in plane rotation. Integrated over time and with the vision-based tracker, a robust result for the pose can be obtained.

In a system and/or method implementing RFID tags on a non-planar surface and a more complex scan volume, given that the scan volume and the surface of the RFID tags are known, constraints on the motion can be obtained. These constraints are dependent on the spatial arrangements of the tags and the shape of the scan volume. For example, constraints on the full six DOF of the pose and orientation can be obtained with a 3-dimensional grid of tags using a scanning volume including three elongated ellipsoids having known correspondences to each other, e.g., arranged in 60 degrees increments. This in turn can bootstrap the vision-based tracker for robust and accurate pose estimates.

Referring now to the RFID tags; if the tags may have re-writeable memory, e.g., flash memory, their locations can be written into an on-board memory of the tag. This would allow a distributed storage of the localization data to make the localization system infinitely scalable. Further, having the location information on the tag will allow simultaneous tracking of multiple tag readers. Each tag reader can include a computing unit to determine its location based on the read tags.

Re-writable tag memory can also be used as a messaging medium. For example, in a multiple user application, one user can use the RFID tag for placing a message for another user to pick up. Various access control schemes can be imposed using the memory and location information.

When active tags are used, the scan range can be increased. This may reduce the need for dense tag placement.

The tag reader including a computing unit (for example, see FIG. 5) can be packaged as an embedded standalone sensor. This can be achieved when the RFID tag has the location in its memory. Otherwise, a communication link, e.g., 802.11g specification, between the tag reader and a central database storing the RFID tag locations can be implemented.

Figure 2:
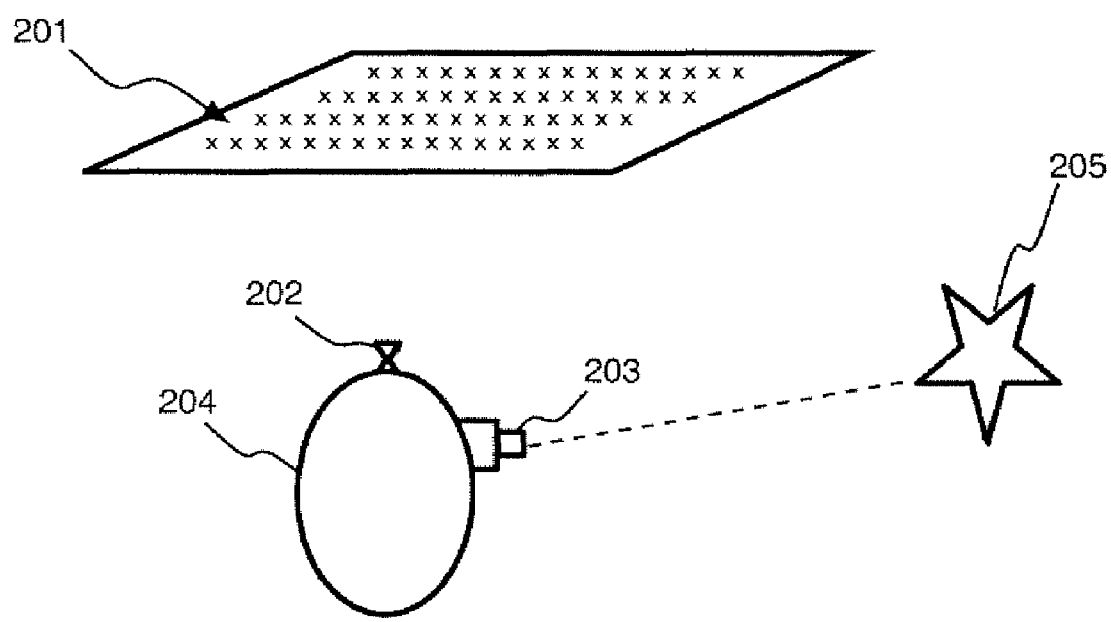
FIG. 2 is a diagram of a hybrid system for object localization according to an embodiment of the present disclosure.

FIG. 2 depicts a hybrid tracking system including passive RFID tags 201 placed on a ceiling with known locations, the RFID tags 201 can be a single or multiple flat surfaces, and the surface can be non-planar. The tag reader 202 and a camera 203 have a fixed pose with respect to one another and are coupled to a first object 204 to be tracked. Further, a second object to be tracked 205 can be tracked using the vision-based tracker 203 using position information gleamed from the tag reader 202.

Given that the positions of the RFID tags 201 in the environment are known, the shape of the scanning volume is used to determine the location of the tag reader 202. The amount of localization information can be obtained from the tag reader 202 will be determined by the shape of the scan volume as well as tags 201 and their placements. Using this information, the position and orientation of the camera 203 of the vision-based tracker can be determined for markerless tracking of a second object 204. The second object 205 may be in the known environment as defined by the RFID tags 201 or outside of the known environment. The camera 203 only needs to know its own location within the environment to determine a position of the second object 205.

Further, the vision-based tracker can implement a variety of technologies, including for example, using dominant line detection in an image to determine the orientation of the camera 203, in addition to the RFID reader 202, the first object 204 and/or the second object 205. For example, orientation information determined by dominant line detection can be fused with the constraints from the RFID scanner. Using information form the RFID reader and vision-based system can be used to determine unknowns about the motion of the camera 203 can be recovered using feature or marker-based methods.

Localization in larger environments, such as within a factory or an office building, can be used in, for example, augmented reality, and security and access control. Further uses may include data caching based on the location when storage and bandwidth limit the amount of data that can be stored.

A localization system according to an embodiment of the present disclosure can be implemented for use under various parameters, including infrastructure, speed, size and mobility, computational and electrical power needs, and accuracy and robustness.

The localization system uses at least a minimum infrastructure for setup and maintenance.

The localization system should provide localization results in a timely manner. The speed of location update can depend on the application. In a see-through augmentation system, speeds of about 30 Hz or more can be used. In a large area localization system, the update rates can be in the order of 1 Hz or less.

The tracker, e.g., RFID reader or hybrid RFID reader/vision-based system, can be mobile, for example, carried by a person or coupled to a vehicle such as a forklift in a warehouse environment.

For a mobile tracker the computation and electrical power needs may be similar to a mobile PC having 2 GHz CPU and a power supply of about 5 Watts.

The localization results should be accurate for a desired application. For example, in see-through augmentation, the accuracy may need to be on the order of millimeters. In a pure localization application, accuracy may be on the order of 10 centimeters. Results are also robust; reliable at any given time.

In addition to the parameters described herein, additional parameters can be addressed, for example, privacy. In the case of tracking a human, since no tags are placed on the user, many privacy issues attributed to RFID technology can be avoided. The voluntary use of the localization system will allow the option to withhold the positional information from unwanted sites. In the case of the embedded sensor where the location information is read from the stationary tag itself, complete containment of the location information can be achieved.

Figure 3:
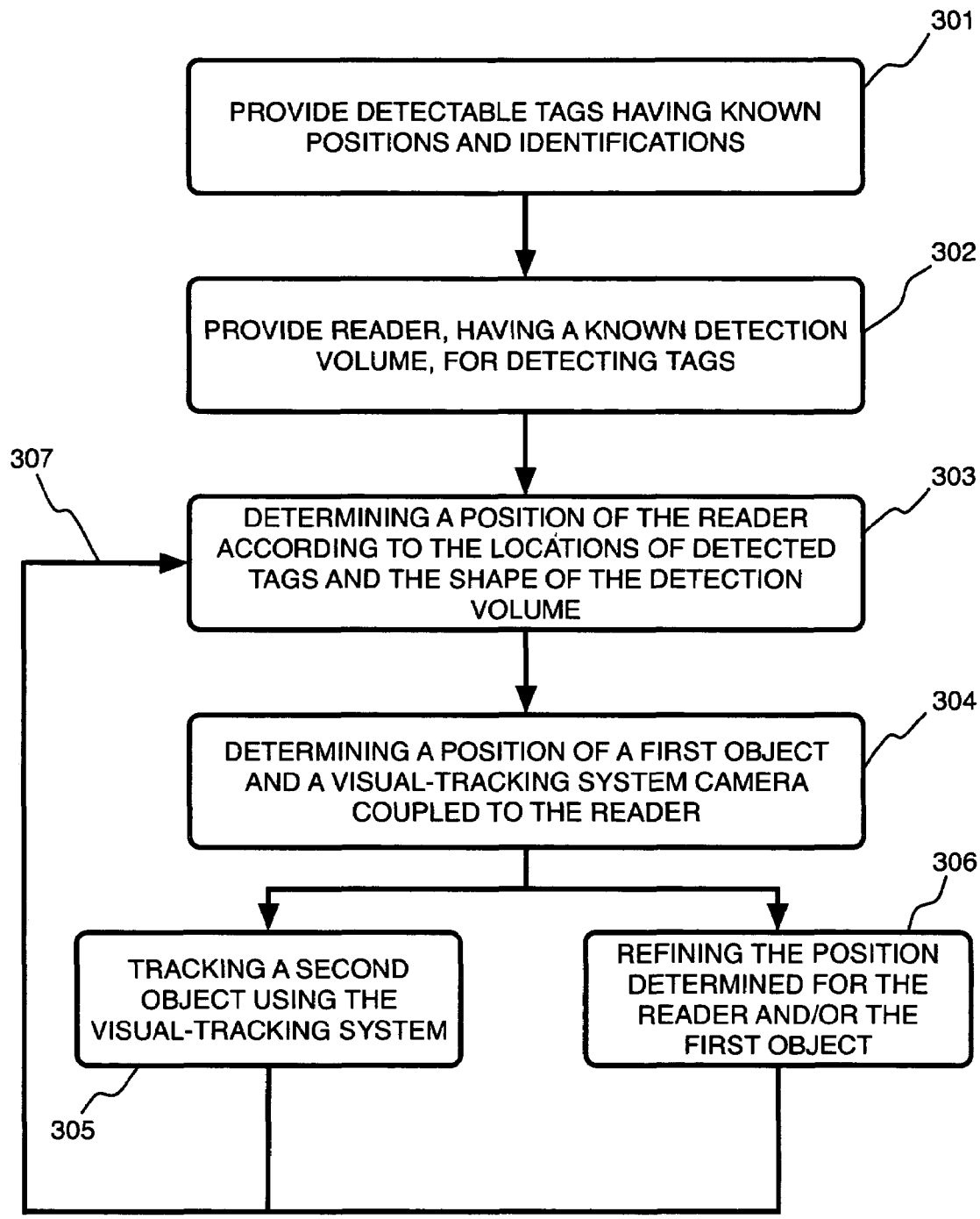
FIG. 3 is a flow chart of a method according to an embodiment of the present disclosure.

Referring now to FIG. 3, according to an embodiment of the present disclosure, a method for tracking includes providing detectable tags 301. The detectable tags each have a fixed position within an environment and known ID. The detectable tags define a common coordinate system for the environment. For increased precision, each tag has a unique ID. A reader is provided for detecting the detectable tags and reading the IDs 302. The reader detects the detectable tags within a known detection volume of space. A position of the reader is determined/tracked according to IDs read by the reader, some sub-set of the total number of tags, and the known volume of space 303. A first object coupled to the reader may be localized using the position of the reader 304. The determination of the position may be over time, tracking the reader/first object through/around the environment. A camera of a visual-tracking system having a known position and pose with respect to the reader may be provided. Thus, the position and pose of the camera can be determined using the positional information determined for the reader 304. A second object in or around the environment can be tracked using the visual-tracking system 305 using the determined position and pose of the camera. Further, the position of the first object determined using the reader may be refined using the vision-based tracking system 306. For example, upon determining a dominant line in a scene captured by the camera to be a horizontal line (e.g., ceiling) an orientation determined using the reader may be refined. The determination of the reader's position, the camera's position and the first and/or second object's positions may be repeated over time 307.

Figure 4:
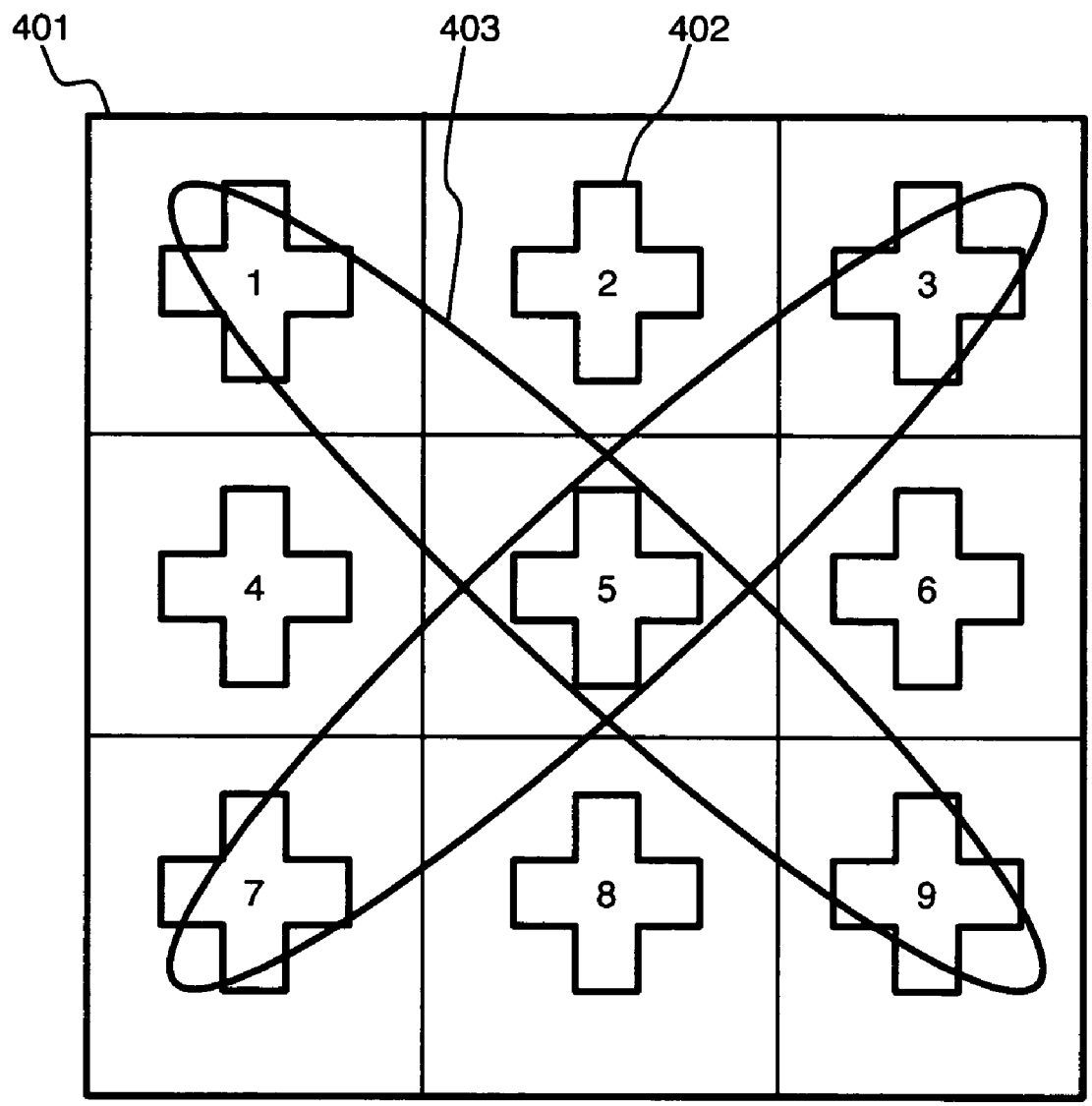
FIG. 4 is an illustration of an array of RFID tags and a scanning volume according to an embodiment of the present disclosure.

Referring to FIG. 4, the position of the reader may be determined using lookup table of tag IDs and position. For example:

| ID | POSITION |
|----|----------|
| 1  | 1.1      |
| 2  | 1.2      |
| 3  | 1.3      |
| 4  | 2.1      |
| 5  | 2.2      |
| 6  | 2.3      |
| 7  | 3.1      |
| 8  | 3.2      |
| 9  | 3.3      |

Given a lookup table of IDs and positions, a coordinate system 401 of tags, e.g., 402 is established. A reader in the vicinity of the coordinate system 401 has a known scanning volume 403. As shown, the reader detects IDs 1, 3, 5, 7 and 9. The IDs are correlated to the locations in the lookup table (e.g., ID 1 to position 1.1; ID 3 to position 1.3, etc.) and the reader determines that its position is at position 2.2 and its orientation is along a certain plane.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
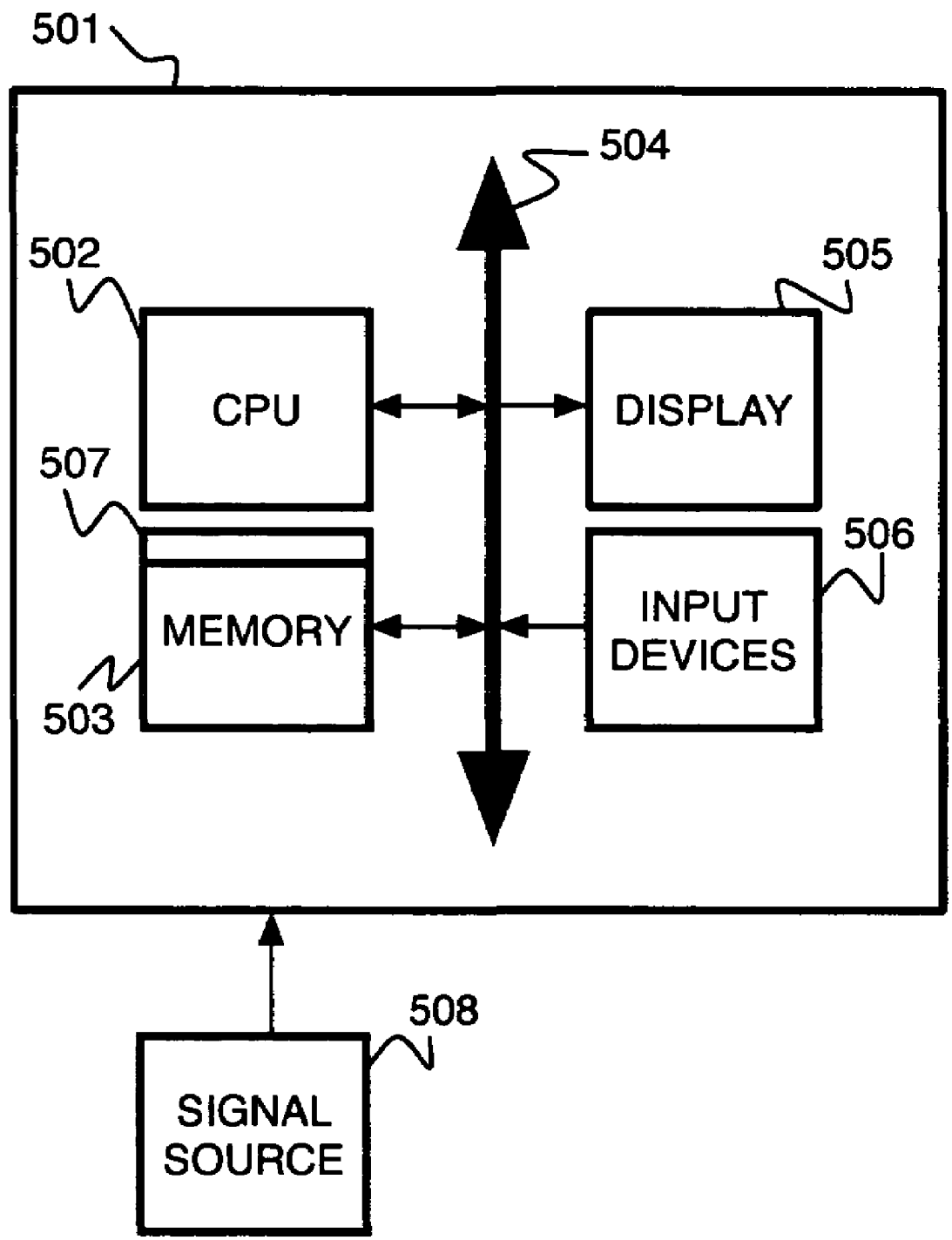
FIG. 5 is a diagram of a system according to an embodiment of the present disclosure.

Referring to FIG. 5, according to an embodiment of the present disclosure, a computer system 501 for implementing a method for object localization comprises, inter alia, a central processing unit (CPU) 502, a memory 503 and an input/output (I/O) interface 504. The computer system 501 is generally coupled through the I/O interface 504 to a display 505, for example, for graphically displaying a location, and various input devices 506 such as a mouse and keyboard, a camera and/or a tag reader. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process the signal from the signal source 508. As such, the computer system 501 is a general-purpose computer system that becomes a specific purpose computer system when executing the routine 507 of the present invention.

The computer platform 501 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for object localization, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for object localization comprising:
   providing a plurality of tags having fixed positions within an environment and known identifications;
   providing a reader, for detecting the tags and reading the identifications, wherein the reader detects a plurality of tags within a scanning volume having a known shape, wherein the scanning volume comprises one or more ellipsoid-shaped volumes;
   determining a subset of the plurality of tags within the scanning volume; and
   determining a position of the reader according to the subset of the plurality of tags within the scanning volume and the known shape of the scanning volume.

2. The computer-implemented method of claim 1, wherein the reader determines the subset of the plurality of tags within the scanning volume from a lookup table according to the identification of each tag within the scanning volume.

3. The computer-implemented method of claim 1, further comprising refining the position of the reader using a vision-based tracking system having a camera with a known position and pose with respect to the reader.

4. The computer-implemented method of claim 1, further comprising tracking a first object coupled to the reader according to the position of the reader.

5. The computer-implemented method of claim 4, further comprising refining the position of the first object using a vision-based tracking system having a camera with a known position and pose with respect to the reader.

6. The computer-implemented method of claim 1, further comprising tracking a second object using a vision-based tracking system having a camera with a known position and pose with respect to the reader.

7. The computer-implemented method of claim 1, further comprising determining the position of the reader over time.

8. The computer-implemented method of claim 1, further comprising writing the identification and position of an active tag of the plurality of tags to an onboard memory of the active tag.

9. A system for tracking comprising:
   a coordinate system of tags within an environment, each tag having a known identification and a known fixed position; and
   a reader for detecting the identifications, wherein the reader detects tags within a scanning volume having a known shape, the reader determining its position according to the known fixed positions of the tags and the known shape of the scanning volume, wherein the scanning volume comprises one or more ellipsoid-shaped volumes.

10. The system of claim 9, further including a vision-based tracker including a camera coupled to the reader at a known position and pose thereof.

11. The system of claim 9, wherein a first tag comprises a memory for storing the known identification and the known fixed position.

12. The system of claim 9, wherein the scanning volume comprises multiple ellipsoidal scanning volumes with known correspondences there between.

13. A program storage device readable by machine, tangibly embodying a program of instructions executable by the machine to perform method steps for object localization, the method steps comprising:
   providing a plurality of tags having fixed positions within an environment and known identifications;
   providing a reader, for detecting the tags and reading the identifications, wherein the reader detects a plurality of tags within a scanning volume having a known shape, scanning volume comprises one or more ellipsoid-shaped volumes;
   determining a subset of the plurality of tags within the scanning volume; and
   determining a position of the reader according to the subset of the plurality of tags within the scanning volume and the known shape of the scanning volume.

14. The computer-implemented method of claim 13, wherein the reader determines the subset of the plurality of tags within the scanning volume from a lookup table according to the identification of each tag within the scanning volume.

15. The computer-implemented method of claim 13, further comprising refining the position of the reader using a vision-based tracking system having a camera with a known position and pose with respect to the reader.

16. The computer-implemented method of claim 13, further comprising tracking a first object coupled to the reader according to the position of the reader.

17. The computer-implemented method of claim 16, further comprising refining the position of the first object using a vision-based tracking system having a camera with a known position and pose with respect to the reader.

18. The computer-implemented method of claim 13, further comprising tracking a second object using a vision-based tracking system having a camera with a known position and pose with respect to the reader.

19. The computer-implemented method of claim 13, further comprising determining the position of the reader over time.

20. The computer-implemented method of claim 13, further comprising writing the identification and position of an active tag of the plurality of tags to an onboard memory of the active tag.

* * * * *